US008815041B2

(12) United States Patent
Underwood et al.

(10) Patent No.: US 8,815,041 B2
(45) Date of Patent: Aug. 26, 2014

(54) SELF SUPPORTED PLEATED PANEL FILTER WITH FRAYED MEDIA EDGES

(75) Inventors: Nicholas R. Underwood, Louisville, KY (US); Casey C. Dent, Louisville, KY (US); LaMonte A. Crabtree, LaGrange, KY (US)

(73) Assignee: Clarcor Air Filtration Products, Inc., Louisville, KY (US)

( * ) Notice: Subject to any disclaimer, the term of this patent is extended or adjusted under 35 U.S.C. 154(b) by 60 days.

(21) Appl. No.: 13/327,061

(22) Filed: Dec. 15, 2011

(65) Prior Publication Data

US 2012/0167535 A1 Jul. 5, 2012

Related U.S. Application Data

(60) Provisional application No. 61/428,149, filed on Dec. 29, 2010.

(51) Int. Cl.
| | |
|---|---|
| *B32B 38/04* | (2006.01) |
| *B01D 35/18* | (2006.01) |
| *B01D 46/52* | (2006.01) |
| *B31F 1/00* | (2006.01) |
| *B31D 5/00* | (2006.01) |
| *B01D 46/00* | (2006.01) |
| *B01D 46/10* | (2006.01) |

(52) U.S. Cl.
CPC ........ *B01D 46/0001* (2013.01); *B01D 2265/04* (2013.01); *B31F 1/0025* (2013.01); *B01D 46/523* (2013.01); *B31D 5/0082* (2013.01); *B01D 46/10* (2013.01)
USPC ........... 156/257; 156/268; 156/207; 156/210; 156/270; 156/259; 156/303

(58) Field of Classification Search
CPC .......... B01D 29/0022; B01D 29/0016; B01D 29/111; B01D 29/031; B01D 29/07; B01D 29/19; B01D 29/21; B01D 29/232; B01D 29/25; B01D 46/001; B01D 46/521; B01D 46/54; B01D 46/04; B01D 46/12; B01D 46/0005; B01D 29/0093; B01D 29/0095; B01D 35/18; B01D 46/52; Y10S 264/48; Y10S 55/05; F24F 13/28; B32B 38/04
USPC ........... 156/81, 206, 207, 210, 226, 227, 256, 156/259, 263, 270, 271, 291, 303, 281, 257, 156/268; 55/497, 499, 500, 521; 28/146
See application file for complete search history.

(56) References Cited

U.S. PATENT DOCUMENTS

| | | | | |
|---|---|---|---|---|
| 2,529,042 A | * | 11/1950 | Nanson | 28/146 |
| 2,820,461 A | * | 1/1958 | Muller | 131/339 |
| 2,847,086 A | * | 8/1958 | Muller | 55/489 |
| 3,216,578 A | * | 11/1965 | Muschamp et al. | 210/484 |
| 5,024,870 A | * | 6/1991 | Jackson | 428/181 |
| 6,254,653 B1 | | 7/2001 | Choi et al. | |

(Continued)

*Primary Examiner* — Linda L Gray
(74) *Attorney, Agent, or Firm* — Reinhart Boerner Van Deuren P.C.

(57) ABSTRACT

A panel filter is provided such as for HVAC applications in which one of the cut edges is frayed and attached with adhesive to the inner peripheral surface of a paper board frame. The frayed edges may facilitate better gluing of pleated filter medium to the frame especially for self-supported filter media applications and may increase structural rigidity and sealibility as a whole. Frayed edges also provide flexibility to assist in installation of a card of pleated filter medium into a paper board frame.

20 Claims, 6 Drawing Sheets

(56) References Cited

U.S. PATENT DOCUMENTS

| | | |
|---|---|---|
| 7,156,891 B2 | 1/2007 | Winters et al. |
| 7,255,723 B2 | 8/2007 | Choi et al. |
| 2006/0283162 A1 | 12/2006 | Dent et al. |
| 2012/0234749 A1* | 9/2012 | Maier et al. ............... 210/493.2 |

* cited by examiner

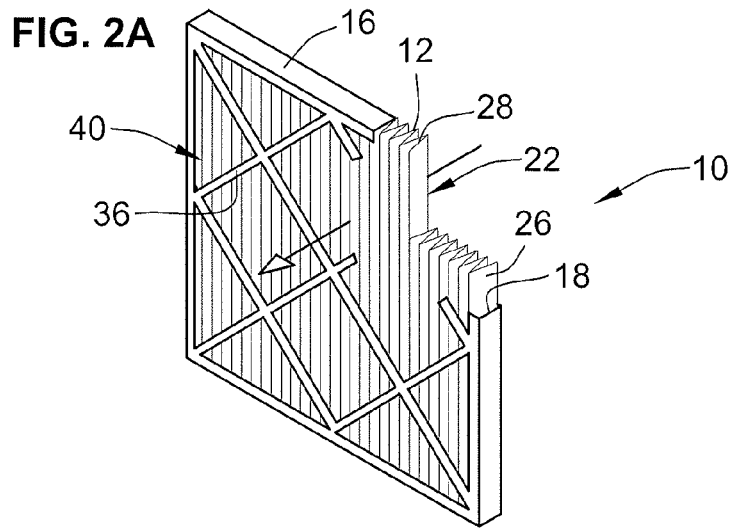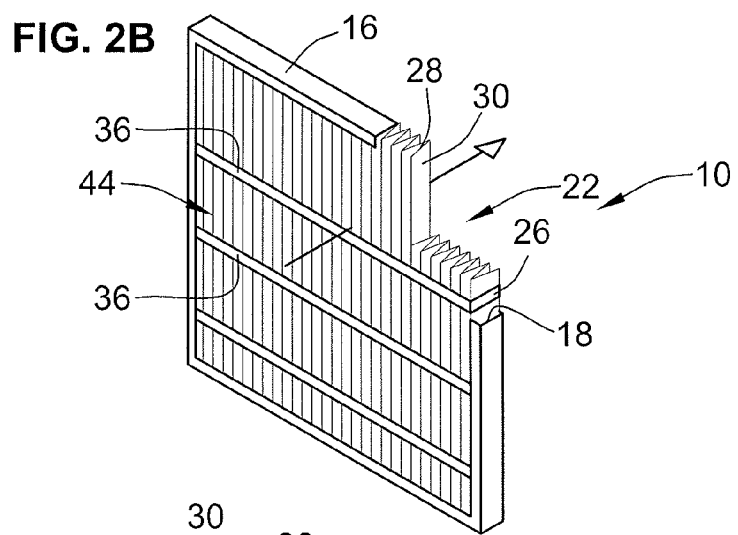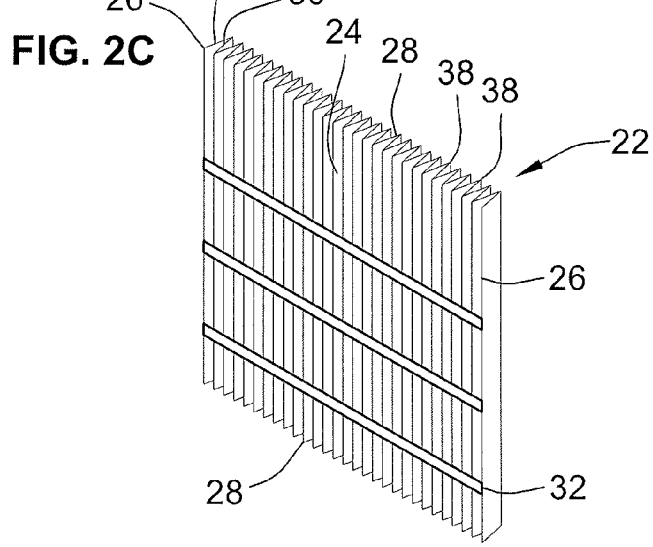

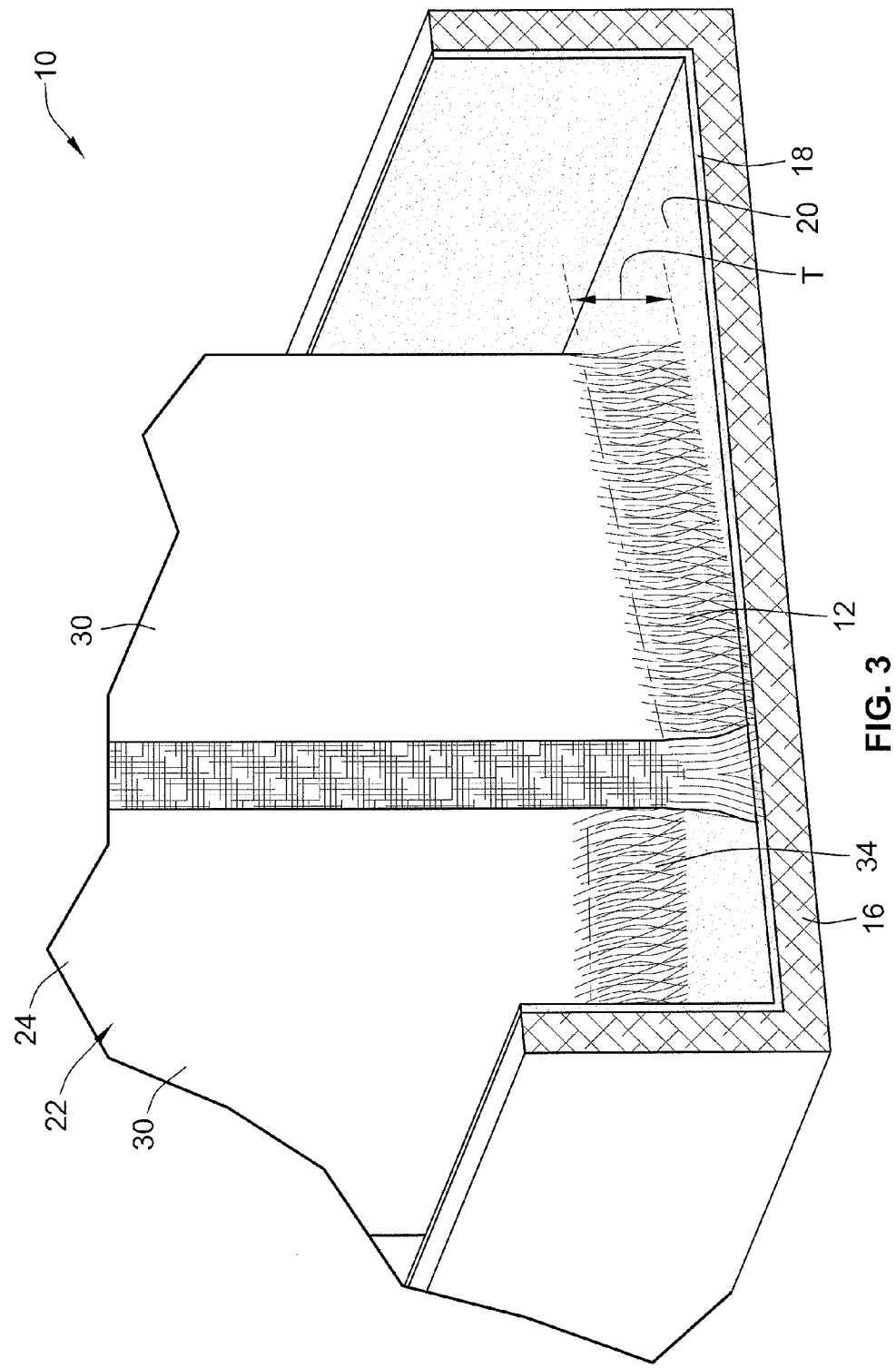

SELF SUPPORTED PLEATED PANEL FILTER WITH FRAYED MEDIA EDGES

CROSS-REFERENCE TO RELATED PATENT APPLICATIONS

This patent application claims the benefit of U.S. Provisional Patent Application No. 61/428,149, filed Dec. 29, 2010, the entire teachings and disclosure of which are incorporated herein by reference thereto.

FIELD OF THE INVENTION

The present invention pertains generally to pleated air filters and more particularly, pleated panel filters in which a rectangular card of pleated filter medium is secured within a rectangular frame and the means by which securement of the rectangular card of pleated filter medium is secured within such a rectangular frame.

BACKGROUND OF THE INVENTION

One common form of pleated air filters is known as a panel filter in which a rectangular card of pleated filter medium is secured within a rectangular paper board frame (e.g. such as fiberboard or cardboard). One common use for such panel filters is in HVAC systems for homes and other buildings where heating, ventilation and/or air conditioning is desired. Because such pleated panel filters are typically low cost disposable items, it is highly desirable to produce such pleated air filters using automated machinery and automated processes which allow manufacturing costs of the filter to be minimized.

Additionally, it is known that the porous filter media which is formed into a pleated accordion like structure may be "self supporting" as disclosed, for example, in U.S. Patent Publication No. 2006/0283162 to Dent et al; and U.S. Pat. No. 7,255,723 to Choi et al.; U.S. Pat. No. 7,156,891 to Winters et al.; and U.S. Pat. No. 6,254,653 to Choi et al. the entire disclosures of these four patent publications is hereby incorporated by reference in their entireties. For example, one form of a self supporting pleated filter medium comprises a multi-component filtration fibers including low melt components and high melt components that have higher melting temperature than the low melt component. In these arrangements, the low melt component is partially melted to a glassy or partially liquefied state and serves to bind the high melt fibers together, thus forming a heat set into the pleats of the pleated filter medium. As a consequence, this filter medium known as self-supporting pleated filter medium, tends to be relatively stiff in nature as compared to other filtration mediums that do not include such a stiffening binder component. Self-supporting pleated filter medium may also include other forms of adhesives or the like within the fibers to provide such a relatively stiff character to pleated filter media card so that while in use, the filter medium is sufficiently stiff and self-supporting to maintain the pleated form when subjected to passage of fluid such as a forced air flow of HVAC systems in buildings. An advantage of such self-supporting media is that wire scrims that may be co-pleated to provide the support for such pleated filter medium may be eliminated or at least reduced in structure. The amount of other external supports to the filter medium can be thus reduced.

While self-supporting pleated filter medium has provided an advance in the art, it is not without its drawbacks in that the relatively stiff nature can pose difficulties. The present invention is directed towards improvements that are particularly advantageous to such self-supporting pleated panel filter elements and can be applied to those embodiments such as described in the above incorporated by reference patent publications or to other such self-supporting applications, and even potentially to other non self-supporting pleated filter element applications.

BRIEF SUMMARY OF THE INVENTION

The present invention is generally directed toward improvements relative to the glue interface between the rectangular card of pleated filter medium and the inner peripheral surface of the rectangular frame where adhesive is conventionally used to attach one or more edges of the pleated filter medium to the inner peripheral surface of the rectangular frame. More specifically, at least one of the edges of the pleated filter medium is a frayed edge and attached with adhesive to the inner peripheral surface of the rectangular frame.

One or more advantages may flow from this arrangement. For example, the frayed edge provides a more flexible surface that allows easier insertion and positioning within the rectangular frame. The frayed edge is more receptive to adhesive and can even act to wick adhesive. A better or structurally more rigid structure may form as a result of glue wicking into the frayed edge converting a flexible structure to a more rigid structure once wicked and cured. Also, better interface sealing may result due to the flexible characteristic of the frayed edge and resilient nature of the media, which presses it into better engagement with the inner peripheral surface of the frame and the adhesive carried there along. Embodiments of the present invention may be used for any of these advantages or for other reasons as may be desired.

A panel filter in accordance with an aspect of the invention, therefore, comprises a rectangular frame having an inner peripheral surface. A rectangular card of pleated filter medium extends within the rectangular frame. The rectangular card has first and second opposed edges and a third and fourth opposed edges extending transversely relative to the first and second opposed edges. At least one of the edges is a frayed edge and attached with adhesive to the inner peripheral surface of the rectangular frame.

Another inventive aspect is directed toward a method of forming such a panel filter comprising: cutting a span of filter medium to have opposed cut edges; and fraying the opposed cut edges. The span of a filter media is pleated, preferably subsequent to the fraying. Also, preferably, the fraying is conducted subsequent to the cutting, but may be also performed simultaneously at the same time with a specialized cutting die (e.g. such as a pinking type cutting device or other cutting device that does not form a sharp cut edge, but rather frays the edge at the same time).

Preferably, and according to one embodiment, the fraying comprises driving brushes on opposed cut edges with brushes engaging at least one millimeter of the cut edge and more preferably at least three millimeters of the cut edge (typically up to about one-half centimeter). Adjustments of the brushes can be made to engage more or less of the cut edge as may be desirable and depending upon other parameters that may be used such as the nature and amount of adhesives and the size. Fraying may also be performed by any other roughening device.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 2(A)-2(C) are perspective illustrations of a panel filter element in accordance with an embodiment of the present invention with FIG. 2(A) showing one inflow or outlet flow side of the filter, FIG. 2(B) showing the other side opposite FIG. 2(A), and FIG. 2(C) showing a rectangular card of pleated filter medium which is to be installed in a rectangular frame;

FIG. 3 is an enlarged cross sectional view of a portion of the panel filter showing the gluing interface between the pleated filter medium and the paper board frame.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 5:
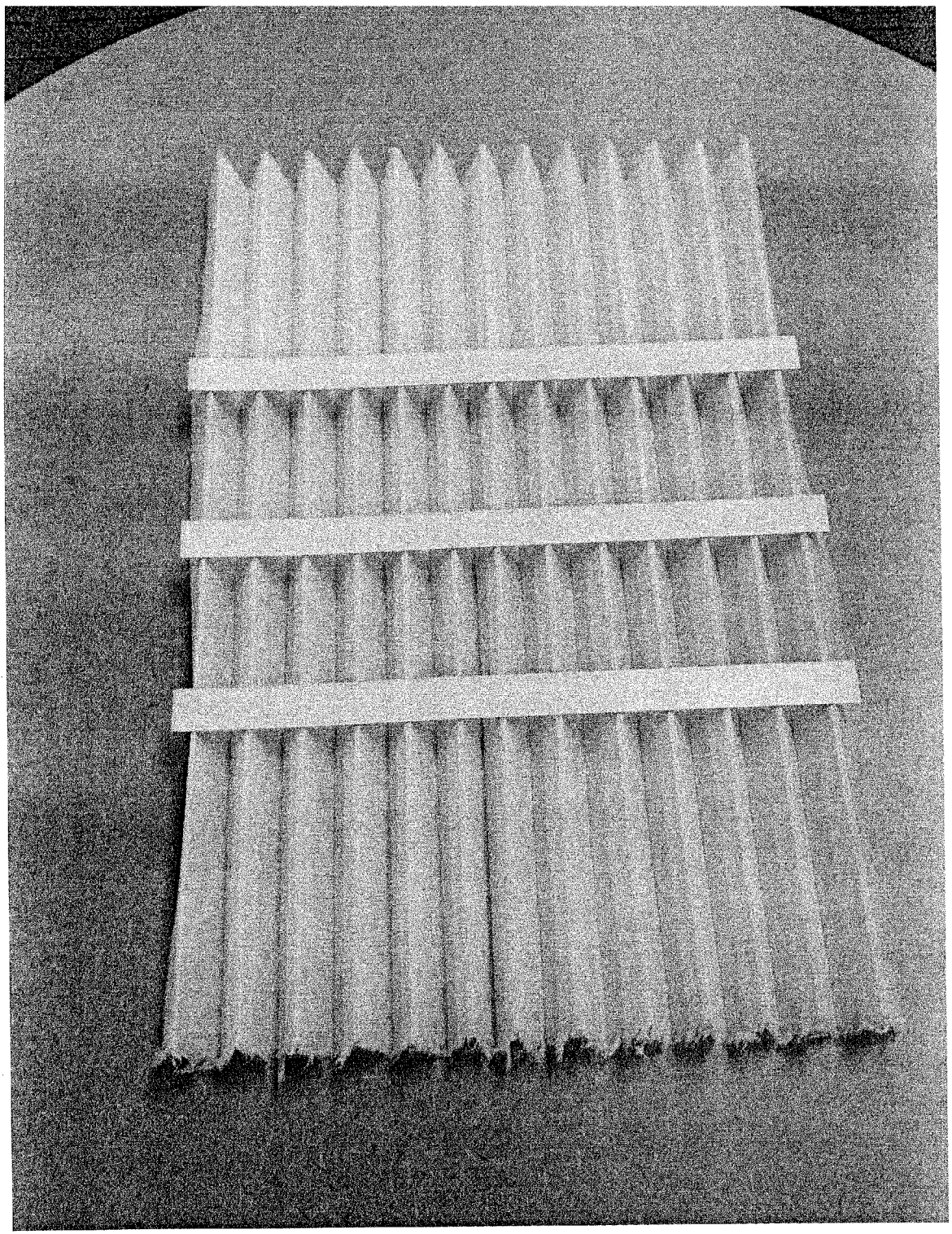
FIG. 5 and FIG. 6 are pictures showing a rectangular card of pleated filter medium having opposed edges with a wavy, pleated configuration that have been frayed in accordance with an embodiment of the present invention.
Figure 6:
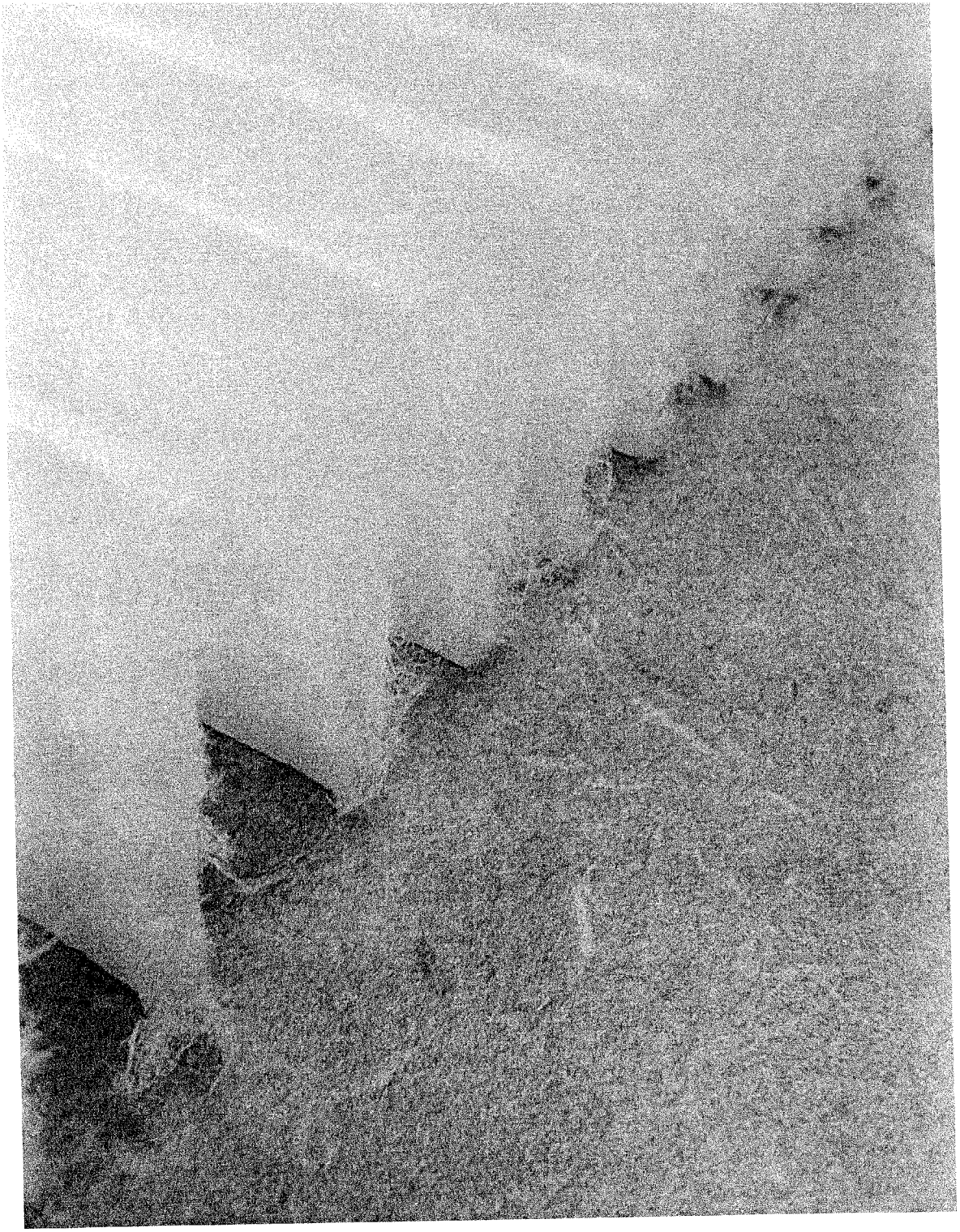

In accordance with an embodiment of the present invention, FIGS. 2(A)-2(C) illustrate a rectangular panel filter 10 having at least one frayed edge 12 of filter medium. The frayed edge 12 can belt to facilitate gluing attachment as shown, for example, in FIG. 3 with the frayed edges being shown in photographic detail in FIG. 5 and FIG. 6.

Panel filter 10 includes a rectangular frame 16 which is preferably of paper board material such as cardboard, paper, fiber material or the like. The frame 16 has an inner peripheral surface 18 that extends around the inner periphery of the frame 16. Adhesive 20 is applied preferably to the entire peripheral surface 16 and thereby lines the entire rectangular inner peripheral surface 18 of the frame. The adhesive 20 is used to secure a rectangular card 22 of pleated filter medium 24 within the rectangular frame 16.

As shown, the card of pleated filter medium includes leading and trailing cut lineal edges 20; and also opposed pleated wavy edges 28 that extend transversely relative to the lineal edges 26. In particular, it can be seen that the wavy edges are formed at the ends of individual pleats with pleat flanks 30 providing these opposed edges with a wavy pleated configuration. The wavy configuration is meant to include different types of pleat tips 38 including pointed pleats or flattened pleats as may be used such, as for example, demonstrated by the aforementioned referenced patents.

As shown, each of the wavy edges 28 are frayed and attached via the adhesive 20 to the inner peripheral surface 18 of the frame 16.

While the lineal edges 26 may also be frayed, the straightness of these structures allow the lineal edges 26 to have better contact, especially considering part of the end flanks may be available for gluing and considering the flexibility afforded in the direction of pleating. As such, lineal edges 26 may be merely cut edges and unfrayed unlike the wavy edges 28. Alternatively, lineal edges 26 may additionally or alternatively be frayed.

Preferably, each of the frayed edges 12 has a thickness perpendicular to the pleated medium (thickness designated T) that is at least one millimeter from a cut line 34 of the frayed edge and more preferably at least three millimeters from the cut line 34 of the frayed edge 12. Preferably, it may be up to or around one-half centimeter but preferably, not more than one centimeter.

The frayed edges 12 are particularly advantageous where the pleated filter medium is a self-supporting pleated filter medium 24 that has individual pleats with pleat flanks 30 that are sufficiently stiff and self-supporting to maintain the pleated form during forced air flow when in use such as in an HVAC system in which forced air is blown through the filter such as in a building.

The self-supporting pleated filter medium may comprise a multi-component filtration fibers (often referred to as bicomponent) including the low melt component in a high melt component that has a higher melting temperature than the low melt component. The low melt component in a post melted state binds the fibers together and thereby provides the relative stiffness into the pleat planks 30. However, as depicted in FIG. 3 and as can also be seen with reference to FIG. 5 and FIG. 6, the binding of the low melt component is substantially broken at the frayed edges 12.

It can also be seen in FIG. 3 that the adhesive 20 tends to wick into each of the frayed edge. Further, as can be appreciated, the frayed edge due to the substantially breaking of the binding provided by the low melt component is relatively flexible as compared to the more stiff nature of the pleats. This facilitates more easy insertion of the card 22 into the panel filter frame 16 during assembly. With the adhesive 20 extending around the entire inner peripheral surface 18 of the frame 16, the adhesive 20 serves to sealingly bond and substantially prevent leak passages between the pleated filter medium 24 and the frame 16. Further, with the adhesive 20 attending to wick into the frayed edges 12 an even stiffer structure once assembled may be provided in some embodiments if sufficient adhesive is present due to the fact that the adhesive once cured provides binding and structural strength. Further, the frayed edges 12 due to the increased flexibility may be sized slightly greater than the rectangular inner peripheral surface 18 such that once the card 22 is inserted, it may easily bend and thereby engage with the inner peripheral surface and provide for increased gluing surface between the frame 16 and the card 22 of pleated filter medium also providing structural strength and increased sealability.

The frame and support structure provided by the frame may take various forms such as disclosed in the aforementioned patents which have been incorporated by reference. For example, in one embodiment, the frame 16 includes integral webbing 36 that has adhesive applied thereto (such as glue or hot melt) and which is bonded to pleat tips 38 (either pointed or flattened pleat tips) along a first face 40 of the panel filter 10. Further, as shown, for example in FIG. 2(C), prior to assembly and FIG. 2(B) once assembled a plurality of support strips 42 (which may also be formed similarly from paper board material) are bonded with adhesive such as hot melt or glue to the pleat tips 38 along a second face 44 of the panel filter 10 opposite the first phase. One of the first and second faces may form the inlet face while the other forms the outlet face or it may be interchangeable either way. Typically, the frame is paper board and size and configured for an HVAC system of a building.

Figure 1:
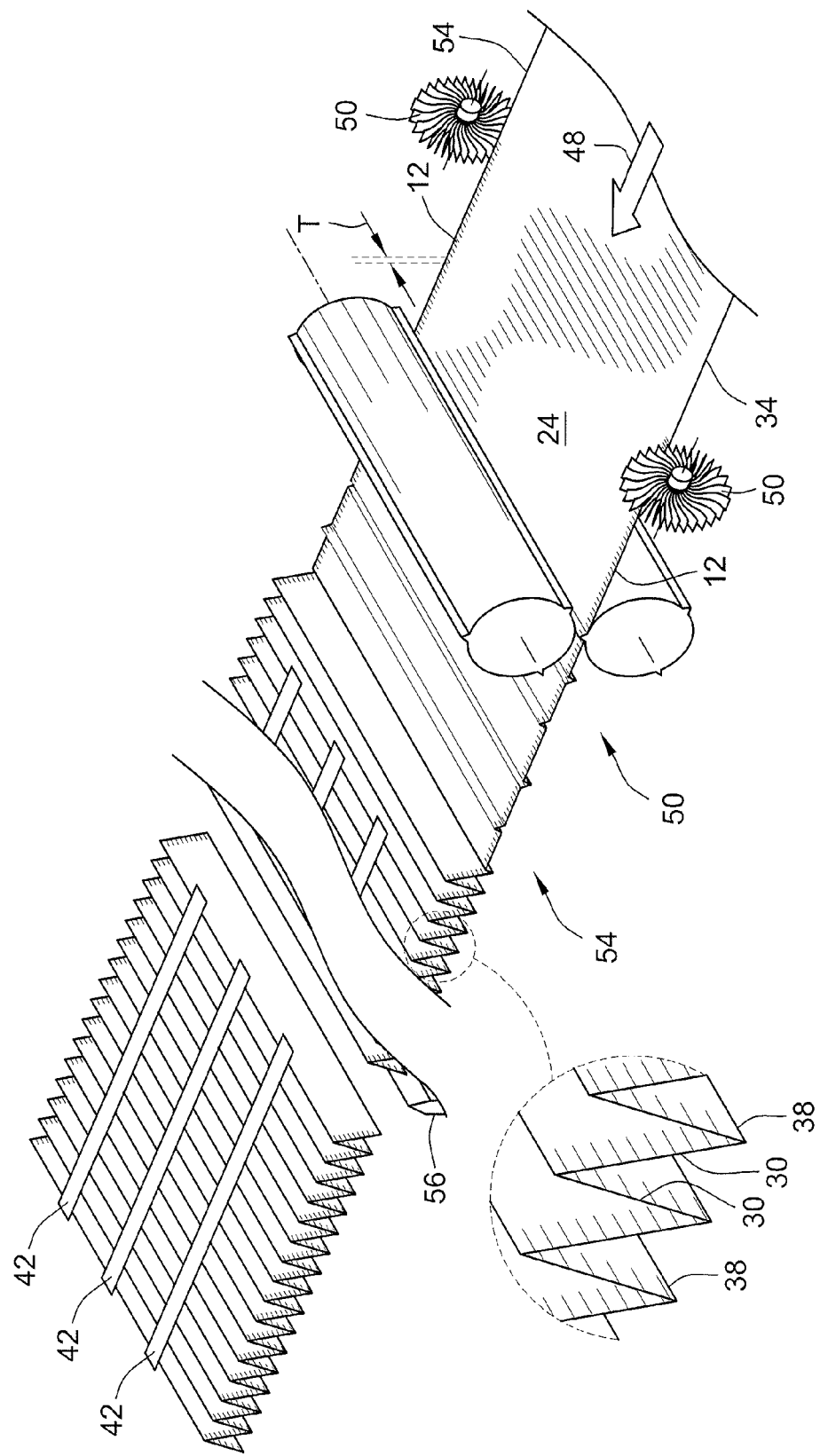
FIG. 1 is a schematic prospective view of the process for forming a panel filter according to an embodiment of the present invention.
Figure 4:
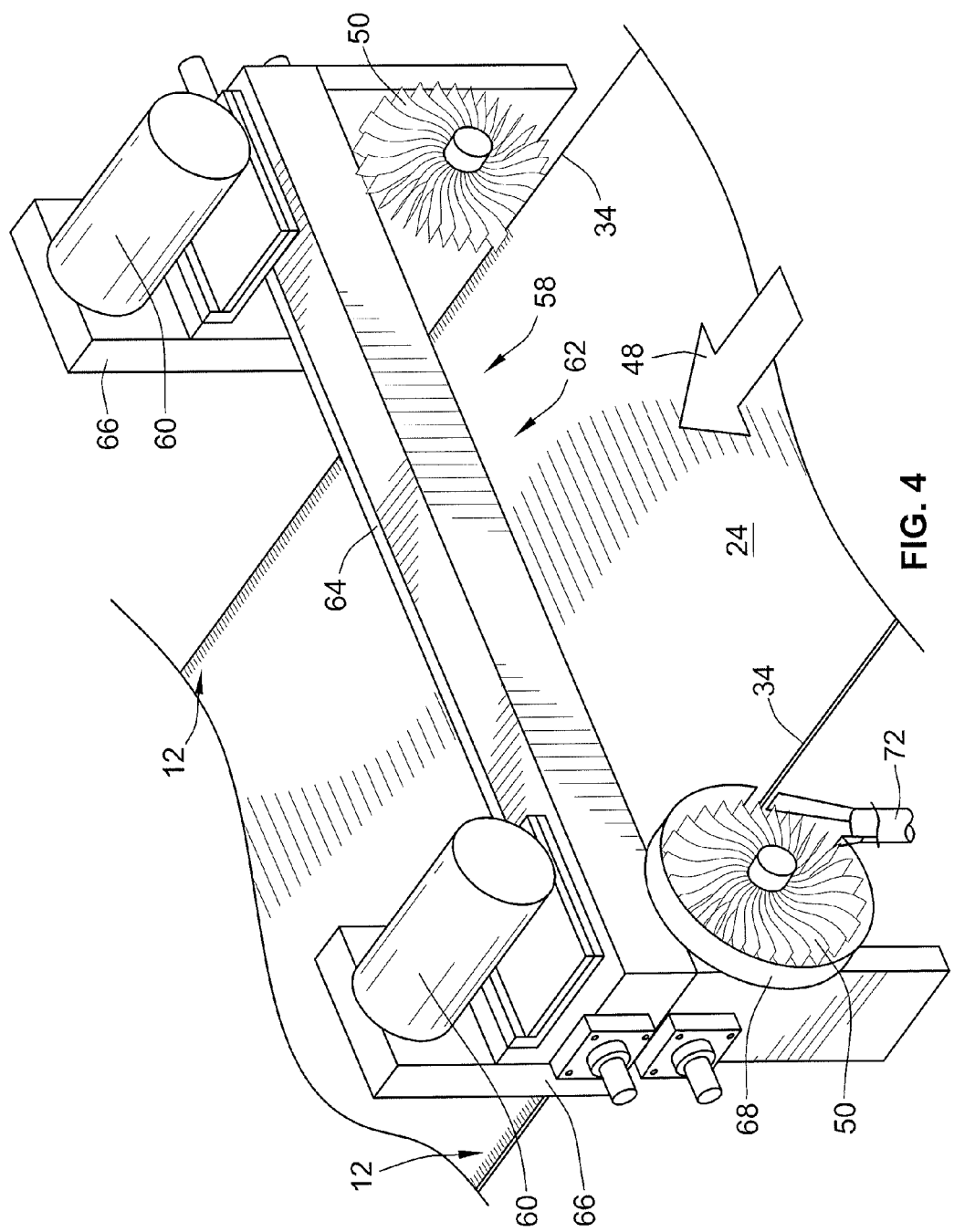
FIG. 4 is a perspective illustration of a frame assembly structure including brush fray heads engaging opposing sides of self-supporting filter medium; the filter medium being run along a line prior to a scoring and pleating station.

Turning to FIG. 1 and FIG. 4, methods and manufacturing equipment are illustrated. As shown therein, cut filter medium 24 prior to pleating is being advanced along a manufacturing line 48 such as being unwound from a roll of filter media (not shown). The roll of filter media may already have been cut to provide the cut line 34 or alternatively an upstream splicing station may be used to trim and thereby cut the filter media to the desired width. In either event, the span of filter medium is cut to have opposed cut edges. Also illustrated, is that rotating fraying brushes 50 are used and employed to engage the opposed cut edges at cut line 34 thereby forming frayed edges 12. In this embodiment, fraying is accomplished by opposed rotating brushes which engage upon and act on opposed cut sides of the filter medium 24 which is being moved along the manufacturing line 48. Thereafter, the media may be moved through a scoring station 52 and a pleating station 54 which are effective to fold the media into a pleated accordion like fashion as it is moved along the manufacturing line. Thereafter, and to hold the spacing of the pleats, lineal support strips 42 are applied and glued to the pleat tips 38. Thereafter, at a cutting station 56, the cards 22 of pleated filter medium 24 are cut. From there, the individual cards 22 of pleated filter medium 24 can be adhesively attached into a frame having adhesive lining the inner peripheral surface thereof.

While one embodiment is shown for performing the fraying 50, it will be appreciated that other suitable means may also perform the fraying. For example, a splicing head may be used to simultaneously cut and fray the opposed cut edges at the same time and are, therefore, covered by embodiments of the present invention. For example, the cutting head may include a pinking type head to provide its own wavy pattern along the cut edges where additional compression or engagement with the splicing device may fray rather than provide a sharp cut. More preferably, subsequent engagement of the cut edge such as through a fraying, brush or simple engagement of the cut edges being moved against a stationary surface or brush may be employed to reduce the binding provided by the low melt component of the filter medium. Belts, sanders, or other devices may alternatively be used as the fraying means as well. Further, while pleating is shown subsequent to the fraying and is preferred, it is also possible to fray the edges during or after the pleating step with the same means.

As show in FIG. 4, an assembly 58 is illustrated for facilitating the fraying of the cut edges. As shown therein, motors 60 supported on opposing sides is a port head chasis 62 drive and rotate fraying brushes 50 in engagement with the opposed cut edges of the filter medium 24 being moved along the manufacturing line 48. A screw 64 can move opposed carriages 66 of the support head chassis 62 toward and away from each other to thereby adjust how much fraying is conducted against the cut edges and to accommodate different widths of filter media. Guides 68 also surround the edges and have an opening 60 to support and align the opposed edges of the filter medium relative to the fraying brushes 50. Additionally, a vacuum 72 is provided on each slide and approximate to each fraying brush 50 (only one side being illustrated in FIG. 4). From that, any debris or fibers generated due to the fraying can be sucked out and eliminated from the internal manufacturing environment.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of forming a panel filter, comprising:
   cutting a span of filter medium to have opposed cut edges;
   fraying the opposed cut edges such that frayed portion of the filter medium is more flexible than the unfrayed portion;
   pleating the span of filter medium;
   cutting the filter medium into sheets, each sheet having at least one frayed edge; and
   inserting at least one frayed edge of a sheet in a frame having adhesive therein, such that the adhesive wicks up the frayed edges to create a structure, when the adhesive cures, that is more rigid than would have been created if the at least one frayed edge were not frayed.

2. The method of claim 1, further comprising:
   cutting the filter medium periodically transversely to said cutting a span to create rectangular sheets of pleated filter medium;
   arranging the rectangular sheet in a rectangular frame; and
   adhesively attaching the frayed opposed cut edges to the rectangular frame.

3. The method of claim 2, further comprising bonding pleat tips on opposed faces of the pleated filter medium to webbing or strips extending over each of the opposed faces.

4. The method of claim 1, wherein said fraying comprises driving brushes on the opposed cut edges with the brushes engaging at least 1 mm of the cut edge.

5. The method of claim 4, further comprising vacuuming fiber debris generated by the driving of the brushes against the cut edges.

6. The method of claim 1, wherein the pleating is subsequent to said fraying.

7. A method of forming a panel filter, comprising:
unwinding a roll of filter media such that the filter media is propelled linearly;
simultaneously fraying opposing edges of the filter media and cutting the filter media into rectangular sheets as the filter media is being unwound; and
attaching the rectangular sheets to its own frame using an adhesive such that the adhesive wicks up the frayed edges of the filter media.

8. The method of claim 7, wherein fraying opposing edges of the filter media comprises fraying opposing edges of the filter media using two rotating fraying brushes positioned at the opposing edges of the unwinding filter media.

9. The method of claim 7, wherein each fraying brush is configured to fray its respective opposing edge such that the frayed edge is at least 1 mm in length.

10. The method of claim 9, wherein each fraying brush is configured to fray its respective opposing edge such that the frayed edge is less than 1 cm in length.

11. The method of claim 7, wherein unwinding a roll of filter media comprises unwinding a roll of bicomponent filter media comprising a low-melt fiber component bonded to a high-melt fiber component, and wherein the fraying opposing edges breaks the bond between the low-melt and high-melt fiber components.

12. The method of claim 7, wherein attaching the rectangular sheets to its own frame comprises attaching the frayed opposing edges of the filter media to an inner peripheral surface of the frame.

13. The method of claim 7, further comprising pleating the filter media as it is being unwound.

14. A method of forming a panel filter, comprising:
providing a multi-component filter media having at least two opposing edges;
engaging the at least two opposing edges with a fraying apparatus configured to break a bond between two components of the multi-component filter media and fray the at least two opposing edges;
attaching a sheet of the multi-component filter media to a panel filter frame using an adhesive such that the adhesive wicks up the frayed edges of the filter media.

15. The method of claim 14, wherein providing a multi-component filter media comprises providing a multi-component filter media having low-melt fibers heat-bonded to high-melt fibers, and wherein the fraying apparatus breaks the bond between low-melt and high-melt fibers.

16. The method of claim 14, further comprising pleating the multi-component filter media before attaching the sheet of multi-component filter media to the panel filter frame.

17. The method of claim 16, wherein providing a multi-component filter media further comprises providing a self-supporting multi-component filter media configured to maintain its pleated form during forced air flow through the filter media.

18. The method of claim 14, wherein attaching a sheet of the multi-component filter media to a panel filter frame comprises:
providing a panel filter frame with an inner peripheral surface;
applying an adhesive to the inner peripheral surface;
bringing the at least two opposing edges into contact with the adhesive.

19. The method of claim 18, wherein providing a panel filter frame comprises providing a panel filter frame with integral webbing configured to engage a pleated tip of the multi-component filter media.

20. The method of claims 14, wherein engaging the at least two opposing edges with a fraying apparatus comprises engaging the at least two opposing edges with a fraying apparatus comprising one of a rotating brush, a belt, and a sander.

* * * * *